(12) United States Patent
Williams, III et al.

(10) Patent No.: US 6,883,102 B2
(45) Date of Patent: Apr. 19, 2005

(54) APPARATUS AND METHOD FOR PERFORMING POWER MANAGEMENT FUNCTIONS

(75) Inventors: Gerard Richard Williams, III, Sunset Valley, TX (US); Kim Rasmussen, Austin, TX (US); David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 546 days.

(21) Appl. No.: 10/020,511

(22) Filed: Dec. 18, 2001

(65) Prior Publication Data

US 2003/0115491 A1 Jun. 19, 2003

(51) Int. Cl.[7] .............................. G06F 1/30; G06F 9/44; G06F 9/455
(52) U.S. Cl. ..................... 713/300; 717/124; 717/134
(58) Field of Search .................. 713/300; 717/134, 717/124

(56) References Cited

U.S. PATENT DOCUMENTS

| | | | | |
|---|---|---|---|---|
| 5,630,052 A | * | 5/1997 | Shah | 714/38 |
| 5,650,939 A | * | 7/1997 | Yoshida | 700/286 |
| 5,832,286 A | * | 11/1998 | Yoshida | 713/324 |
| 5,900,739 A | * | 5/1999 | Gaglani | 324/765 |
| 5,982,815 A | * | 11/1999 | Ramirez | 375/224 |
| 6,353,565 B1 | * | 3/2002 | Ito | 365/201 |

* cited by examiner

Primary Examiner—Lynne H. Browne
Assistant Examiner—Matthew Henry
(74) Attorney, Agent, or Firm—Nixon & Vanderhye P.C.

(57) ABSTRACT

The present invention provides a data processing apparatus and method for testing power management instructions. The data processing apparatus comprises a processor for executing data processing instructions including power management instructions, at least one of the power management instructions being a command power management instruction. A power management controller is also provided for receiving command data from the processor when a command power management instruction is executed by the processor, and to control power management logic to perform an associated set of power management functions dependent on the command data. The data processing apparatus includes first power management logic controllable by the power management controller, with the power management controller also having an interface to enable communication with additional power management logic. In accordance with the present invention, the processor is arranged when executing the command power management instruction to specify within the command data provided to the power management controller whether an emulation mode of operation is set. The power management controller is arranged when the emulation mode is not set to initiate the associated set of power management functions dependent on the command data, whilst if the emulation mode is set it is arranged to only initiate a subset of the associated set of power management functions not requiring communication over the interface. By this approach, it is possible to perform some testing of power management software before all aspects of the power management hardware have been designed.

27 Claims, 8 Drawing Sheets

APPARATUS AND METHOD FOR PERFORMING POWER MANAGEMENT FUNCTIONS

BACKGROUND OF THE INVENTION

1. Field of the Invention

The present invention relates to an apparatus and method for performing power management functions.

2. Description of the Prior Art

In a system which includes power management hardware, the validation of such a system would typically require that all components of this system, both hardware and software, be functional. Whilst the power management hardware and the power management software can be developed in parallel, it is often the case that the power management software is ready to be tested before the hardware design is complete. There is hence typically a delay in testing the software resulting from awaiting completion of the hardware design.

Up to now, system level power management functions have been constructed using implementation-specific hardware. For example, memory-mapped hardware registers can be programmed to shut off clocks to subsystems.

However, there is generally a desire to design system hardware such that it can be re-used in different implementations, and with specific regard to power management hardware, this has led to the design of some generic power management hardware which is not implementation specific, with that generic power management hardware having a standard interface for interfacing to implementation specific power management hardware. An example of the implementation specific power management hardware would be the voltage regulators used to control the power rails of the system.

In designs that incorporate such generic power management hardware, it would be desirable to be able to perform some testing of the power management software without waiting for the design of the implementation-specific power management hardware to be complete.

SUMMARY OF THE INVENTION

Viewed from a first aspect, the present invention provides a data processing apparatus, comprising: a processor for executing data processing instructions including power management instructions, at least one of said power management instructions being a command power management instruction; a power management controller for receiving command data from the processor when a command power management instruction is executed by the processor, and to control power management logic to perform an associated set of power management functions dependent on said command data; first power management logic controllable by the power management controller; the power management controller having an interface to enable communication with additional power management logic; the processor being arranged when executing said command power management instruction to specify within said command data provided to the power management controller whether an emulation mode of operation is set, said power management controller being arranged when said emulation mode is not set to initiate said associated set of power management functions dependent on said command data, and being arranged when said emulation mode is set to only initiate a subset of said associated set of power management functions not requiring communication over said interface.

In accordance with the present invention, the power management software can include a number of command power management instructions, each of which is arranged to cause an associated set of power management functions to be performed under the control of a power management controller. The power management controller is able to control first power management logic provided as part of the data processing apparatus, and also has an interface to enable communication with additional power management logic. In preferred embodiments of the present invention, the first power management logic will be generic power management logic, whilst the additional power management logic that the power management controller can communicate with via the interface will be implementation specific power management logic.

To enable a command power management instruction to be tested even if the additional power management logic is not in place, the processor is able when executing a command power management instruction to specify within the command data provided to the power management controller whether an emulation mode of operation is set. If the emulation mode is set, the power management controller is arranged to initiate only a subset of the power management functions that would otherwise be performed as a result of the command power management instruction, that subset of power management functions being those power management functions not requiring communication over the interface.

By such an approach, it is possible to test that a command power management instruction executes correctly on the existing power management hardware, prior to the complete design of the power management hardware being completed.

It will be appreciated that the first power management logic provided as part of the data processing apparatus could take a variety of forms. However, in preferred embodiments, the power management logic comprises one or more power management isolation layers, each power management isolation layer being associated with a component of the data processing apparatus, and being controllable by the power management controller to isolate the associated component from other components of the data processing apparatus dependent on the command power management instruction being executed by the processor.

Hence, in accordance with preferred embodiments of the present invention, command power management instructions can be written which cause individual components, or groups of components, to be isolated and this functionality can be tested in an emulation mode of operation, even if all of the required power management logic elements are not in place. As an example, assuming that the voltage regulators used to actually control the voltage supply to individual components of the data processing apparatus are implementation specific power management logic elements, which have not yet been designed, then in emulation mode a command power management instruction can be tested to ensure that the power management isolation layers are controlled correctly, without requiring the power management controller to also seek to cause the power supply to be altered as required by the command power management instruction.

The components of the data processing apparatus associated with each power management isolation layer can take a variety of forms, for example, a system clock, a Random Access Memory (RAM), a Read Only Memory (ROM), a processor, etc. In preferred embodiments, the data processing apparatus further comprises one or more additional processors, and each processor has one of said power management isolation layers associated therewith, thereby enabling command power management instructions to be written which isolate particular processors or combination of processors.

In preferred embodiments, a handshake protocol is employed between the processor and the power management controller, such that when said processor issues said command data to said power management controller, said power management controller issues an acknowledgement signal to the processor to acknowledge receipt of the command data. By this approach, the processor can ensure that the command data has been successfully received by the power management controller before it overwrites that command data.

It will be appreciated that there are various mechanisms by which the command data produced by the processor as a result of executing the command power management instruction may be transferred to the power management controller. In preferred embodiments, a communication path coupling the processor and the power management controller is provided, the communication path including a transmit channel on which the processor is arranged to issue the command data to the power management controller. In preferred embodiments where the handshake protocol is employed, the acknowledge signal from the power management controller is also passed over the transmit channel to the processor.

Preferably, the processor includes a transmit register for storing the command data to be issued over the transmit channel. By storing the command data in such a transmit register, that command data is readily available to the processor should it be necessary to reissue the command data to the power management controller.

Preferably, the emulation mode is specified by the value of a field within the transmit register. In preferred embodiments, a 1-bit field is used to specify the emulation mode, thereby minimising the number of bits required in the transmit register to store the emulation mode information.

When the data processing apparatus is operating in a normal mode of operation, then once a particular command power management instruction has been executed, for example to power down a particular component or group of components within the data processing apparatus, then typically an external reset controller is used to issue a reset signal to the power management controller to repower those powered down components, and hence cancel the effect of executing the command power management instruction. However, when in emulation mode, the interface to additional power management logic is not activated, and accordingly such an external reset signal will not be received. Accordingly, in preferred embodiments, when the data processing apparatus is executing in said emulation mode, then once said subset of said associated set of power management functions have been performed, said power management controller is arranged to emulate a reset function to cancel said subset of said associated set of power management functions. Hence, in such preferred embodiments, the power management controller internally emulates the reset function in order to cancel the effect of the command power management instruction.

Once the reset function has been performed, then the component or components that had been effected by the execution of the command power management instruction need to be placed into their correct state before further data processing instructions are executed on the data processing apparatus. Accordingly, in preferred embodiments, following the reset function, the processor is arranged to execute a status power management instruction to cause a request to be issued to the power management controller for status data identifying the status of the data processing apparatus after execution of said command power management instruction.

In preferred embodiments, the power management controller is arranged to keep a record of that status data after execution of the command power management instruction so that it can subsequently be provided to the processor following such a request. More specifically, in preferred embodiments, the power management controller includes a status register and is arranged to store said status data in the status register after performance of said associated set of power management functions, the processor including a receive register for storing the status data as provided by the power management controller upon receipt of said request.

It will be appreciated that there are a number of mechanisms which may be used for passing information back and forth between the processor and the power management controller. However, in preferred embodiments, the data processing apparatus further comprises a communication path coupling said processor and said power management controller, said communication path comprising a transmit channel on which the processor is arranged to issue said command data to the power management controller, and a receive channel on which the processor is arranged to issue said request to said power management controller and on which the power management controller is arranged to return said status data.

In such embodiments, the processor preferably further includes a channel status register for storing a first flag indicating whether the transmit channel is busy and a second flag for indicating whether the receive channel is busy. In preferred embodiments, these flags take the form of 1-bit fields within the channel status register. Only when the first flag indicates that the transmit channel is empty can a new command be sent to the power management controller. Similarly, only when the second flag indicates that the receive channel is empty can the power management controller send status data to the processor.

In preferred embodiments, the processor comprises a processor core and a coprocessor and said coprocessor is arranged to execute said power management instructions. This frees up the processor core from the job of executing such power management instructions. In such embodiments, the transmit register, receive register and channel status register are preferably provided within the coprocessor.

Viewed from a second aspect, the present invention provides a method of operating a data processing apparatus to test power management instructions, comprising the steps of: (a) executing on a processor a command power management instruction to generate command data; (b) issuing said command data to a power management controller; (c) controlling, via the power management controller, power management logic to perform an associated set of power management functions dependent on said command data, the data processing apparatus having first power management logic controllable by the power management controller, and the power management controller having an interface to enable communication with additional power management logic; at said step (a), the processor being arranged when executing said command power management instruction to specify within said command data provided to the power management controller whether an emulation mode of operation is set; and at said step (c), said power management controller being arranged when said emulation mode is not set to initiate said associated set of power management functions dependent on said command data, and being arranged when said emulation mode is set to only initiate a subset of said associated set of power management functions not requiring communication over said interface.

In preferred embodiments, the method may also provide additional method steps as set out in the appended claims.

Viewed from a third aspect, the present invention provides a computer program product carrying a computer program for controlling an apparatus in accordance with such a method.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
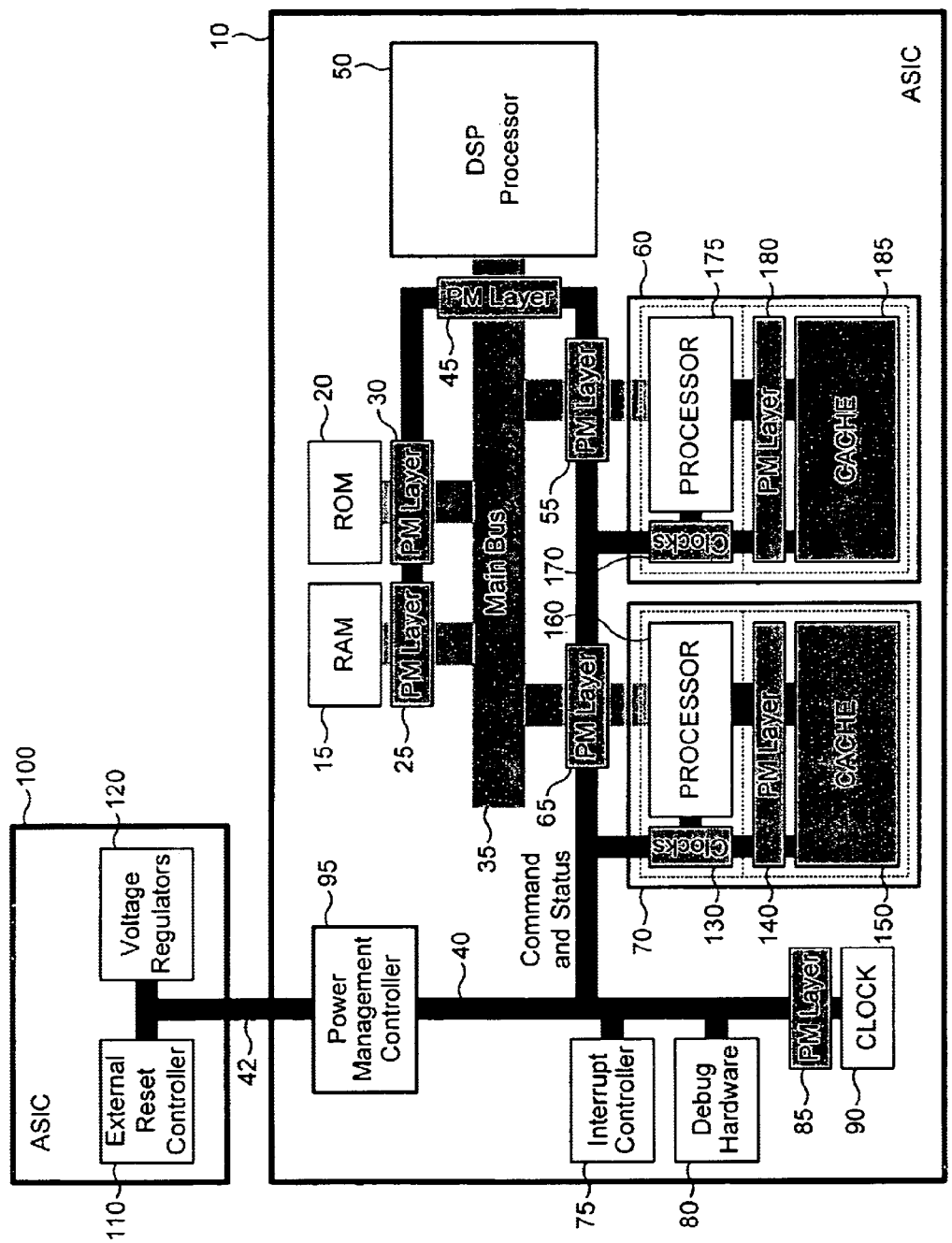
FIG. 1 is a block diagram of a system in accordance with an embodiment of the present invention when configured to operate in a normal mode of operation.

FIG. 1 is a block diagram of a system in accordance with an embodiment of the present invention whereby all of the power management logic is in place to enable the system to operate in a normal mode of operation. The overall system consists of a data processing apparatus 10, which may for example be an ASIC, coupled via a bus 42 with another data processing apparatus 100, which may for example be implemented as a further ASIC. In such an example, both ASICs 10, 100 may be provided on the same board.

The data processing apparatus 10 is intended to be reusable in many different implementations, and provides a particular arrangement of components provided to process data processing instructions. In particular, in this example, the data processing apparatus 10 has three processing circuits 50, 60, 70 coupled via a main bus 35 with a number of memory devices, in this example Random Access Memory (RAM) 15 and Read Only Memory (ROM) 20. In the particular example of FIG. 1, processing circuits 60 and 70 are intended as general purpose processing circuits, whilst processor 50 is a Digital Signal Processing (DSP) processor that will typically be used for particular types of processing operations, for example graphics and image processing.

In the example illustrated in FIG. 1, each of the general purpose processing circuits 60, 70 consists of both a processor 175, 160 and a cache memory 185, 150, along with associated clocking circuitry 170, 130 to control the operation of the processors and the cache memory. In addition, in this example, a power management layer 180, 140 is positioned between the processor 175, 160 and the cache memory 185, 150 to enable the processor to be isolated from the cache memory during particular power management modes.

It will be appreciated by those skilled in the art that there is no requirement for embodiments of the present invention to have the particular arrangement of processing circuits illustrated in FIG. 1, or for any general purpose processing circuits to have the particular construction illustrated in FIG. 1. Embodiments of the present invention may have one or more processors, and such processors may be general purpose processors or processors intended to perform specific tasks.

In addition to the main bus 35 over which instructions and data can flow between the processors and the memory devices, a command and status bus 40 is provided for transmission of various types of control information between the various components. As illustrated in FIG. 1, a main clock 90 is coupled to the command and status bus 40 for the transmission of clock signals to the various components, whilst additionally an interrupt controller 75 is coupled to the bus 40 for handling interrupts generated during the execution of data processing operations. Further, in the example of FIG. 1, debug hardware 80 is also provided for use in performing debug operations on the data processing apparatus 10.

In preferred embodiments of the present invention, some generic power management components are also provided within the data processing apparatus 10. In particular, a power management controller 95 is provided which is connected to the command and status bus 40 whilst in addition separate power management layers 25, 30, 45, 55, 65 and 85 are coupled to the power management controller 95 via the command and status bus 40, each power management layer being associated with a particular component which may be subject to power management control. In the example illustrated in FIG. 1, each of the processors 50, 60, 70, the RAM 15, the ROM 20 and the clock 90 have separate power management layers associated therewith, thereby enabling particular power management modes to be applied to those individual components as defined by particular power management instructions.

Hence, as illustrated by FIG. 1, in preferred embodiments of the present invention, each component's power management is controlled through the system's power management controller 95 as dictated by particular power management instructions executed by one of the processors. Each power management layer 25, 30, 45, 55, 65 and 85 can be considered as a power management isolation layer, enabling the associated component to be "locked out" from the main (system) bus 35, hence placing the "locked out" component in the idle state. As will be appreciated by those skilled in the art, the actual design of each power management isolation layer will be dependent on the component with which it is associated, but will be similar in design to the power management isolation layer 140, 180 that is associated with the processor cache for clock, reset and control signal isolation from the processor signals.

It will be appreciated that the detailed power management is often highly application specific. However, the processor that runs the power management software and controls the clocks and power switching to subsystems, for example the processors 50, 60, 70, RAM 15, ROM 20 or clock 90, needs to support a basic set of power management modes, which typically vary from a mode in which the subsystem is fully powered to a mode in which the subsystem is powered off, with various stages in between. As an example, the following basic set of power management modes will typically be provided for each processor:

RUN in this mode the processor is executing instructions and able to communicate with the power management controller to invoke power management functions;

STANDBY in this mode, the processor clocks are stopped, and the processor is ready to wake-up back to RUN mode on an interrupt or debug event;

DORMANT in this mode, the processor state is saved away, and a soft-reset is required to return to the RUN mode. Once the state is restored, then interrupts should be re-enabled and the wake-up event serviced by the interrupt service routine; and SHUTDOWN in this mode, the processor and any associated cache are turned off and powered down. The entire CPU state plus any memory state that is not backed up in main memory externally must be saved away. A hard reset is required to reinitialise the cache and the processor, the state must be reloaded and only then should interrupts be re-enabled and the wake-up event serviced by the interrupt service routine.

Whilst the various power management isolation layers provided within the data processing apparatus 10 enable the individual components to be isolated in accordance with the required power management modes, they do not in themselves provide any control over the actual power supply to the individual components. Instead, this is provided by voltage regulators 120 provided within the ASIC 100. Further, it will be appreciated that to return from a power management mode it is necessary to invoke a reset process, and this will typically occur via a signal issued by an external reset controller 110 to the power management controller 95 over bus 42.

It will be appreciated by those skilled in the art that both the external reset controller(s) 110 and the voltage regulators 120 are typically highly implementation specific, and accordingly cannot be provided as generic components within the data processing apparatus 10. Hence, when designing any particular implementation, it is necessary for the implementation specific power management hardware, such as external reset controllers 110 and voltage regulators 120, to be designed, and also for the relevant power management software to be written. As mentioned earlier, it is typically the case that the power management software has been written, and is ready for testing, before the hardware design is complete. In such situations, a delay is incurred before the software can be tested.

Figure 2:
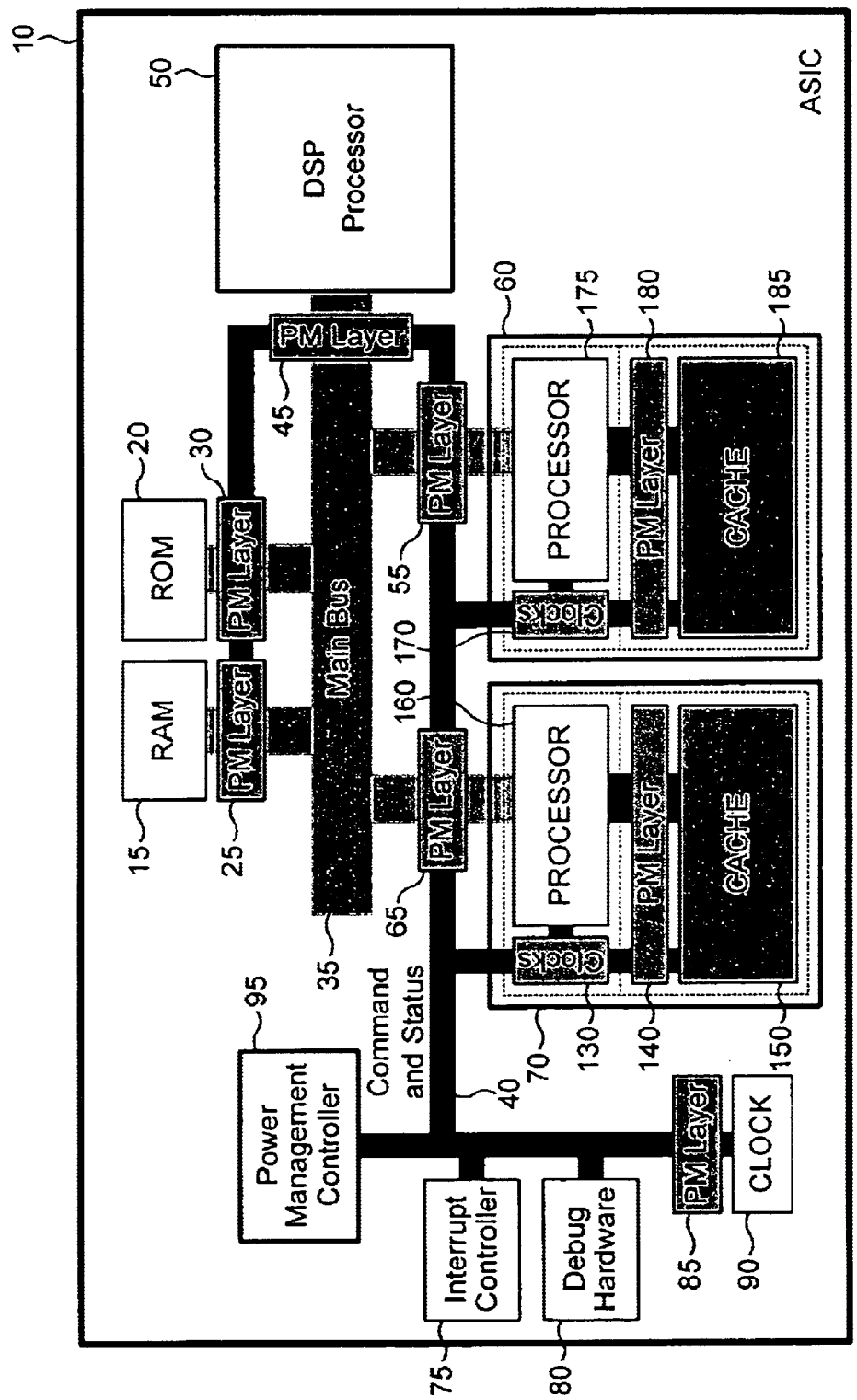
FIG. 2 is a block diagram of a system of an embodiment of the present invention when configured to operate in an emulation mode of operation.

In accordance with preferred embodiments of the present invention, the data processing apparatus 10 is arranged so that it may operate in an emulation mode to enable some testing of such power management software prior to completion of the design of the implementation-specific power management hardware. The physical arrangement of the system of FIG. 1 when operating in an emulation mode is illustrated in FIG. 2. As is apparent from FIG. 2, the system is identical to that of FIG. 1, except that the data processing apparatus 100 including the implementation-specific power management hardware is not present, and accordingly the power management controller 95 is unable to communicate over bus 42 with such components.

Typically, a power management instruction is executed on one of the general purpose processing circuits, for example processing circuit 70, resulting in the generation of certain command data which is sent over bus 40 to the power management controller 95. The power management controller 95 then controls the various power management logic to perform a set of power management functions dependent on that command data. Typically, in the normal mode of operation, this may require the power management controller 95 not only communicating with the power management isolation layers within the data processing apparatus 10, but also communicating with circuitry within the data processing apparatus 100 via the bus 42. A standard interface will typically be provided within the power management controller 95 for interfacing to the bus 42 to enable such communications with the components of the data processing apparatus 100.

In preferred embodiments of the present invention, when the processing circuit executes the power management instruction, and hence generates the necessary command data, it is further able to specify within that command data whether an emulation mode of operation is set. If the emulation mode of operation is set, then the power management controller 95 is arranged to perform any of the power management functions defined by that command data that involve communication with the power management isolation layers within the data processing apparatus 10, but does not perform any of the power management functions that would require communication over bus 42 with the data processing apparatus 100. This enables some testing of the power management software to be performed prior to the design of the data processing apparatus 100 being completed.

Figure 3:
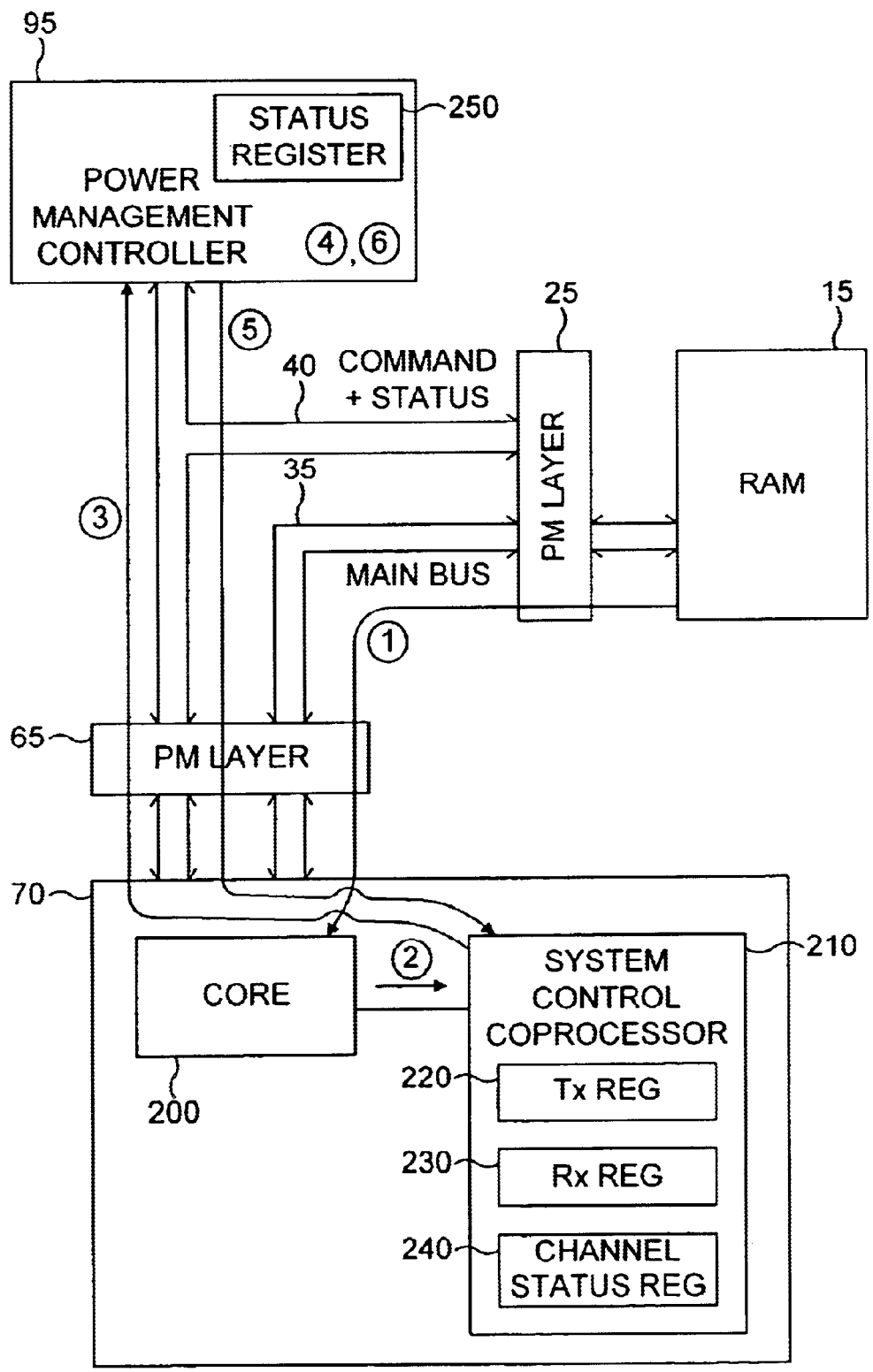
FIG. 3 is a block diagram of part of the system of FIG. 2 used to illustrate execution of a command power management instruction.

Further details of how the processing circuit 70 communicates with the power management controller 95 in the emulation mode of operation will now be described further with reference to FIGS. 3 and 4. FIG. 3 is a block diagram illustrating those components of the data processing apparatus of FIG. 2 required to describe execution of a command power management instruction in accordance with preferred embodiments of the present invention. Command power management instructions are instructions that will typically cause one or more of the components of the data processing apparatus 10 to enter a particular power saving mode.

A sequence of data processing instructions to be executed by the processing circuit 70 will typically reside in the RAM 15, and instructions will be retrieved one at a time by the processing circuit 70 over the main bus 35. In preferred embodiments, the processing circuit comprises a processor core 200 and a system control coprocessor 210, the coprocessor being used to execute certain system control operations. All of the instructions are first passed to the core 200, with those executable by the coprocessor 210 then being passed from the core to the coprocessor for execution.

At some point in the flow of execution, the core 200 will receive a command power management instruction from the RAM 15 via the main bus 35, as denoted by step 1 in FIG. 3. In preferred embodiments, all power management instructions are executed by the system control coprocessor 210, and accordingly at step 2 the core 200 will route the command power management instruction to the system control coprocessor 210. The system control coprocessor will then begin execution of the instruction, resulting in the generation of certain command data which is placed within the transmit register 220 of the coprocessor 210. Details of the command data placed within the transmit register 220 will be provided later with reference to FIG. 5C. When the instruction is to be executed in emulation mode, a field within the transmit register 220 will be set to indicate selection of the emulation mode.

The third step is then for the system control coprocessor 210 to issue the command data from the transmit register 220 to the power management controller 95 over the command and status bus 40. At step 4, the power management controller 95 then processes the command data in order to determine what power management functions to implement. As mentioned earlier, assuming the emulation mode is set, the power management controller 95 will not implement any power management functions that require communication over bus 42 with the external data processing apparatus 100, but instead will only implement those power management functions requiring communication with one or more of the power management isolation layers within the data processing apparatus 10. Hence, in emulation mode, the command data will typically result in the power management controller issuing signals to one or more power management isolation layers to isolate a particular component or group of components. However, the actual isolation of particular components or groups of components does not occur until after the acknowledge signal has been issued by the power management controller 95 at step 5 (discussed below).

In addition to determining which power management layers should be isolated, the power management controller 95 also writes into the status register 250 the system power state resulting from execution of the power management functions specified by the command data.

At step 5, the power management controller 95 communicates via the command and status bus 40 with the system control coprocessor 210 to acknowledge receipt of the command data from the system control coprocessor, this in effect being a handshake protocol by which the system control coprocessor 210 receives confirmation that the command data has been successfully received, and that accordingly the contents of the transmit register 220 can now be overwritten during execution of a subsequent command power management instruction. In preferred embodiments, as part of the "receive" signal issued by the power management controller 95, details are also provided to the system control coprocessor as to which power management layers have been isolated as a result of execution of the command power management instruction.

As mentioned earlier, the system will only exit from such a power saving mode once a reset signal has been received, and typically this is implemented via external reset control circuits 110. However, in emulation mode, there is no communication provided with such circuitry. Accordingly, in emulation mode, the power management controller is arranged at step 6 to assert a soft reset, this in preferred embodiments involving the starting of a timer, which when expired will cause a reset process to be invoked. This process, along with the processes that follow on from that process, will now be described with reference to FIG. 4.

Figure 4:
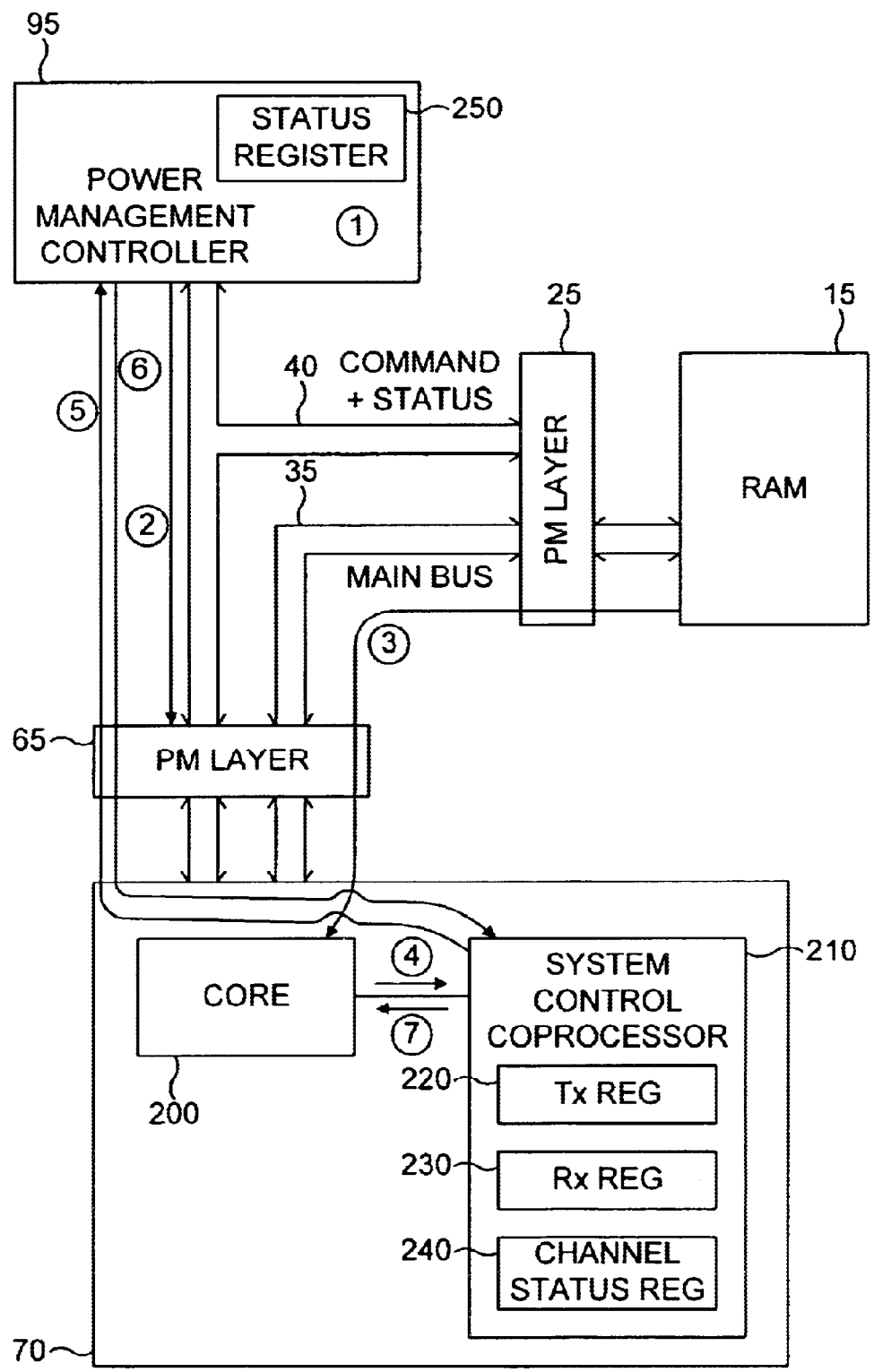
FIG. 4 is a block diagram of part of the system of FIG. 2 used to illustrate execution of a status power management instruction.

FIG. 4 is a block diagram showing the same components as illustrated in FIG. 3. At step 1, the soft reset timer expires, resulting in de-assertion of the soft reset emulated internally by the power management controller 95. This results in a signal being sent from the power management controller 95 to the relevant power management layers to unlock those previously locked power management layers. In FIG. 4, it is assumed that power management layer 65 was locked as a result of execution of the command power management instruction, and accordingly at this point a signal is sent to the power management layer 65 to unlock it.

As a result of unlocking the power management layer 65, the processor core 200 within the data processing circuit 70 is now able to receive data processing instructions from the RAM 15 via the main bus 35. Given the interruption in processing, the instruction flow will typically branch back to a default position, e.g. the start of an instruction code sequence, and the instruction code sequence will be implemented such that one of the first instructions that the core 200 receives is a status power management instruction used to enable the processing circuit 70 to request status information from the power management controller 95 to enable the last programmed state of the system to be retrieved. This is important as it is clearly necessary for the system to be able to return itself to the last programmed state before further data processing instructions are executed.

Accordingly, at step 3, the processor core 200 receives such a status power management instruction, and at step 4 that power management instruction is passed to the system control coprocessor 210 for execution. Execution of the status power management instruction results in a request being issued at step 5 to the power management controller 95 requesting status data. At step 6, this status data is retrieved from the status register 250 and returned via the command and status bus 40 to the system control coprocessor 210, where that status data is stored within the receive register 230. Then, at step 7, the contents of the receive register 230 are transferred back to the core 200 where they are stored within one of the core's registers, and subsequently used to determine what steps are required in order to return the system to its last programmed state.

As shown in FIGS. 3 and 4, the system control coprocessor 210 also includes a channel status register 240 which is used to control the synchronised handshaking between the coprocessor 210 and the power management controller 95. This will be discussed in more detail with reference to FIG. 5A.

Figure 5A:
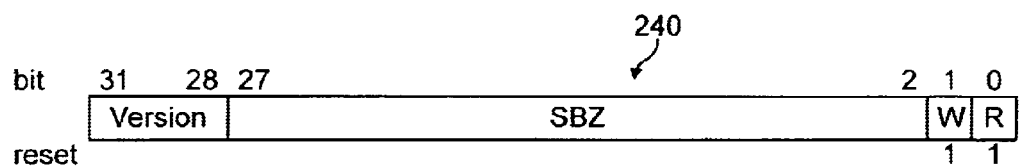
FIG. 5A illustrates the contents of a channel status register in accordance with preferred embodiments of the present invention.

FIG. 5A illustrates the contents of the channel status register 240 in accordance with preferred embodiments of the present invention. In preferred embodiments, the command and status bus 40 includes a transmit channel and a receive channel, the command data resulting from execution of a command power management instruction being issued over the transmit channel, with the "receive" signal returned from the power management controller 95 also being transmitted over the transmit channel. Similarly, the receive channel is used for issuing of the request for status data upon execution of a status power management instruction, with the receive channel also being used for the return of such status data from the power management controller 95.

In preferred embodiments, the channel status register 240 includes at bit position 1 a W flag which is set to denote that the transmit channel is empty and available for a new command to be sent to the power management controller.

When command data is written to the transmit data register, the W flag is cleared until a handshake has acknowledged receipt of the command. Once the acknowledgement has been received, the W flag can be set again to denote that the transmit channel is available for a new command to be sent to the power management controller. Implicitly, the setting of the W flag also indicates that the transmit register is available to be written to. The W flag is also set during a reset operation (either a hard or a soft reset) to indicate that the transmit data register is ready to accept new data.

Bit 0 of the channel status register 240 is used to contain an R flag which is set to denote that the receive data register is full and hence that valid data can be read from the register. The R flag will remain set until the data has been read from the receive data register back to the processor core, at which point the R flag will be cleared to indicate that the receive register 230 is available for re-use. During a hard reset operation, the R flag is set to reflect the reason for waking up the processor.

In preferred embodiments, a predetermined number of the most significant bits, in this example bits 28 to 31, are used to contain a fixed pattern that denotes the power management controller architecture version number of the hardware. Also, in preferred embodiments, the remaining bits of the channel status register, here bits 2 to 27, are reserved and will be read as zero (indicated by SBZ (Should Be Zero) in FIG. 5A).

Figure 5B:
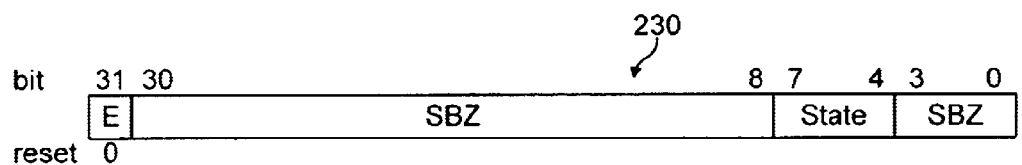
FIG. 5B illustrates the contents of a channel receive data register in accordance with preferred embodiments of the present invention.

FIG. 5B illustrates the contents of the receive register 230 within the coprocessor 210. As mentioned earlier, this is used to store system power state information as returned by the power management controller 95 upon execution of a status power management instruction. In preferred embodiments, the most significant bit, here bit 31, is used to indicate whether the processor issued the command data in emulation mode or not. In preferred embodiments, if that bit is set, this indicates that the command data was issued in emulation mode, whereas if it is clear this indicates that the command data was issued in normal mode. The value reflected here when exiting a reset sequence will be the last programmed state of the system. Another field within the receive register 230 is used to store the system power state, in this example bits 4 to 7 being used for this purpose. The value reflected here when exiting a reset sequence will be the last programmed state of the system, and accordingly will denote states such as normal, idle, off, etc. In preferred embodiments, the remaining bits of the register are reserved and will be read as zero.

Figure 5C:
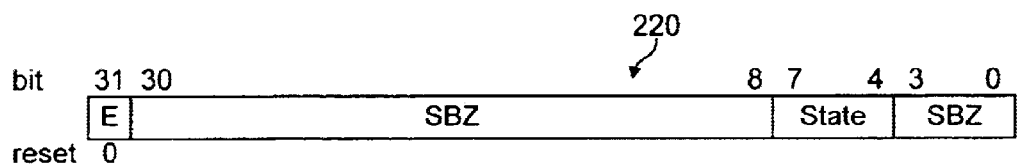
FIG. 5C illustrates the contents of a channel transmit data register in accordance with preferred embodiments of the present invention.

FIG. 5C illustrates the contents of the transmit register 220 of preferred embodiments. As shown in FIG. 5C, in preferred embodiments the most significant bit, here bit 31, is used to indicate whether the processor intends to issue the command data in emulation mode or not. If that bit is set, then the processor is intending to issue the command data in emulation mode, whereas if that bit is clear, then the processor is intending to issue the command data in normal mode. Another field within the transmit register 220, here bits 4 to 7, is used to indicate the next system power state that should result from execution of the command power management instruction, and accordingly will indicate states such as normal, idle, off, etc. This information will be used by the power management controller 95 to determine which power management functions to invoke, and which individual components are to be affected by this next system power state. For example, in preferred embodiments the power management controller 95 can be arranged to independently control the power states of multiple processors. In preferred embodiments, the remaining portions of the transmit register 220 are reserved and will be read as zero.

In preferred embodiments, the interface between the power management controller and the processor (also referred to herein as the CPU) makes use of the signals identified in Table 1 below.

TABLE 1

| Signal | Direction | Description |
| --- | --- | --- |
| PMEXISTS | PM → CPU | If a power management controller is attached to the CPU, the power management controller should drive this to a logic one. If one is not attached, the pin should be a logic zero. |
| PMTXREQ | PM ← CPU | Asserted whenever the CPU is requesting to change its power management state. This signal is used in conjunction with PMTXACK to provide a double-ended handshake during transmission to the power management controller. |
| PMTXACK | PM → CPU | Asserted by the power management controller when it acknowledges receipt of the state change as seen on PMTX[3:0]. |
| PMTX[3:0] | PM ← CPU | Power Management state data associated with a CPU state change request as seen on PMTXREQ. |
| PMTXEMUL | PM ← CPU | The CPU is requesting a state change in power management "emulation" mode if set. This is a request to leave the voltage regulators unchanged. |
| PMRXREQ | PM ← CPU | The CPU is requesting the 'previous state' held by the power management controller. This is used in conjunction with PMRXACK to provide a double-ended handshake during reception with the power management controller. |
| PMRXACK | PM → CPU | The power management controller indicates that data is now valid by acknowledging when PMRXREQ is high. |
| PMRX[3:0] | PM → CPU | The 'previous state' held by the power management controller which can be requested by the CPU. |
| PMRXEMUL | PM → CPU | The 'previous state' of emulation held by the power management controller. |
| SFRESETN | PM → CPU | Active low soft reset indicator to the CPU from the power management controller. |
| HRESETN | PM → CPU | Active low hard/main bus reset to the CPU from the power management controller. |

Figure 6A:
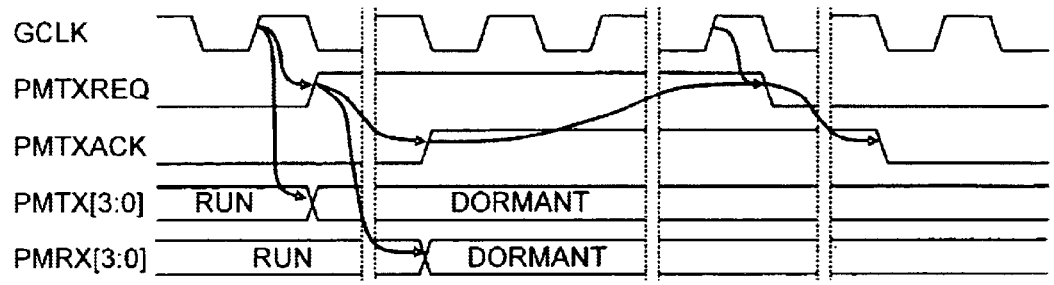
FIGS. 6A and 6B are timing diagrams illustrating the transmission of command data to the power management controller in a normal mode and emulation mode, respectively.
Figure 6B:
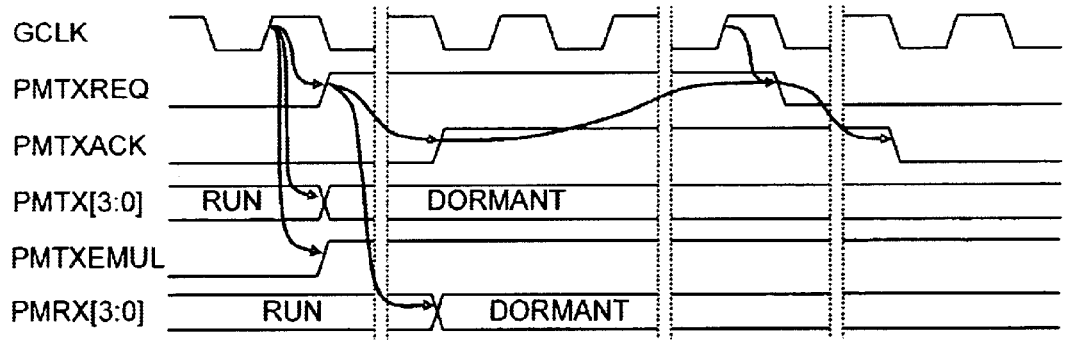

FIGS. 6A and 6B are timing diagrams illustrating the transmission of a change of state from the CPU to the power management controller as a result of executing a command power management instruction, FIG. 6A illustrating a normal mode of operation, and FIG. 6B illustrating an emulation mode of operation. As can be seen in FIG. 6A, if a command power management instruction is indicating that the system power state should change from "RUN" to "DORMANT", then following a rising edge of a clock signal, the processor will be arranged to issue the PMTXREQ signal and the PMTX signal to the power management controller, this resulting some time subsequently in the power management controller issuing the PMTXACK signal, and also the PMRX signal indicating the "previous state" held by the power management controller. Subsequently, both the PMTXREQ and PMTXACK signals will be de-asserted.

Referring now to FIG. 6B, it will be seen that in the emulation mode of operation the timing diagram is basically the same, the only difference being that when the PMTXREQ signal is issued by the coprocessor, the coprocessor also issues the PMTXEMUL signal to indicate that emulation mode is set. In the above described embodiments, this signal is in effect a signal to request that the voltage regulators are left unchanged.

Figure 7A:
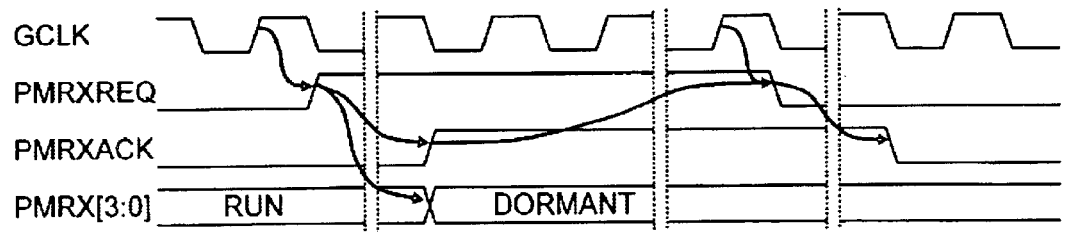
FIGS. 7A and 7B are timing diagrams illustrating the transmission of a request for status data to the power management controller in a normal mode and emulation mode, respectively.
Figure 7B:
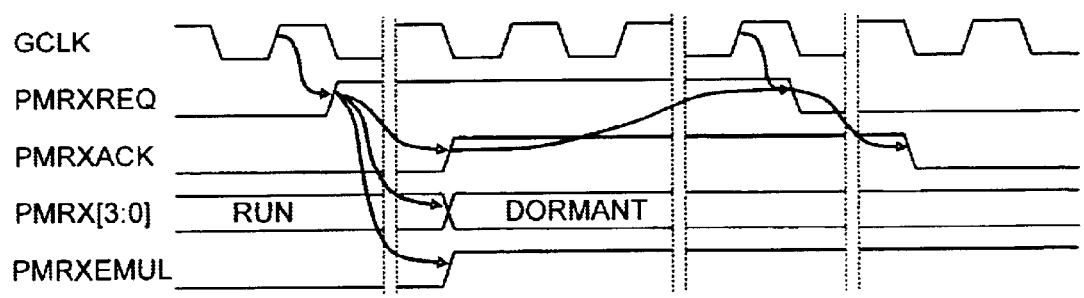

FIGS. 7A and 7B are timing diagrams illustrating the signals issued upon execution of a status power management instruction in both a normal mode and an emulation mode, respectively. With reference to FIG. 7A which illustrates the normal mode of operation, then upon execution of such a status power management instruction, the coprocessor will issue a PMRXREQ signal to the power management controller requesting the previous state held by the power management controller. This will result in the power management controller subsequently issuing the PMRXACK signal as part of the double-ended handshake protocol to acknowledge receipt of the PMRXREQ signal. At the same time, the power management controller will also issue the PMRX signal indicating the previous state held by the power management controller. At some subsequent point, both the PMRXREQ and PMRXACK signals will be de-asserted.

As is apparent from FIG. 7B, the timing diagram is basically unchanged when in the emulation mode, other than the fact that the power management controller will also issue to the processor a PMRXEMUL signal at the same time as issuing the PMRX signal, the PMRXEMUL signal indicating the previous state of emulation held by the power management controller (i.e. whether emulation mode was on or off). Here the transition of the PMRXEMUL signal from the logic zero to the logic one state indicates that the previous state was an emulation state.

Figure 8A:
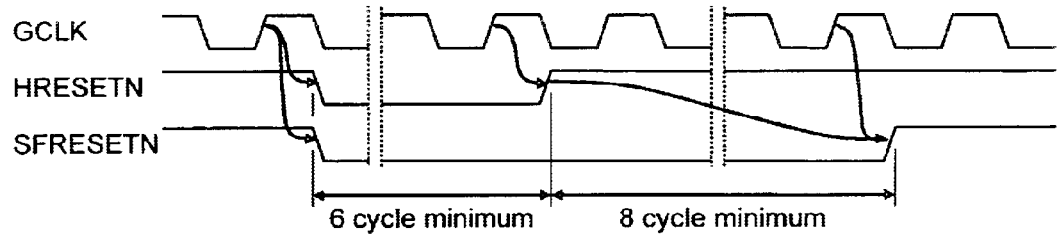
FIG. 8A is a timing diagram illustrating a hard reset process in accordance with preferred embodiments of the present invention.

FIG. 8A is a timing diagram illustrating the hard reset procedure applicable to either normal or emulation mode. As illustrated in FIG. 8A, in preferred embodiments both the hard reset signal HRESETN and the soft reset signal SFRESETN are issued to the processor in the same cycle. Hard reset is then removed a minimum of six cycles later, whilst soft reset is in preferred embodiments extended a further minimum of eight cycles. In preferred embodiments, this arrangement ensures that the processor will properly reset all state.

Figure 8B:
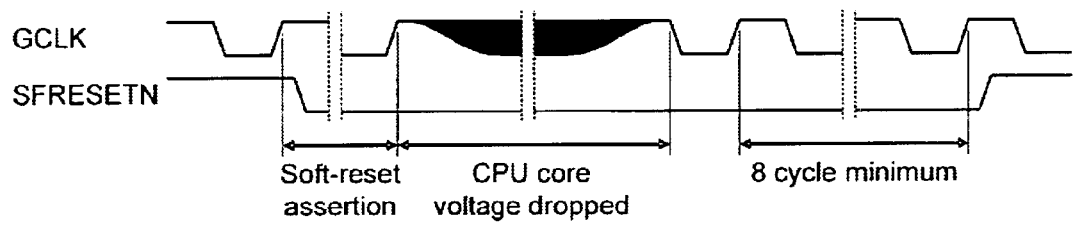
FIGS. 8B and 8C are timing diagrams illustrating a soft reset process in accordance with preferred embodiments of the present invention.

FIG. 8B is a timing diagram illustrating the soft reset process from a power down state, which is applicable to the normal mode of operation. This diagram is used to indicate when a soft reset can be issued following entry into DORMANT state. When the processor has been programmed to enter the dormant state and the power management controller acknowledges the dormant state, the voltage can then be taken away from the CPU core and the voltage to the CPU caches can be lowered to the minimum value that will retain state. The soft reset signal, SFRESETN, is held low when the CPU core voltage is taken away to ensure proper behaviour when the CPU core voltage is returned. Once the CPU core and cache voltages have been raised to the operational value, soft reset is in preferred embodiments held a further minimum of eight cycles to guarantee a proper exit from soft-reset.

Figure 8C:
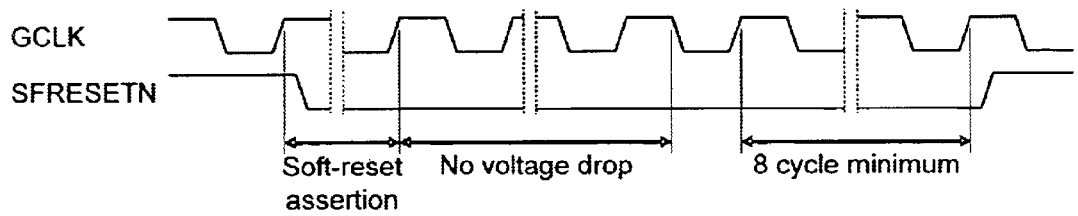

FIG. 8C is a similar timing diagram illustrating the soft reset process from a power down state, which is applicable to the emulation mode of operation. As can be seen from FIG. 8C, the process is basically the same, but in emulation mode there is no lowering of the voltages to the CPU core and the cache, since the subset of the power management functions required to perform such lowering of the voltages is not performed.

As is apparent from the above description of an embodiment of the present invention, an emulation mode is provided in a system to enable both the software and hardware behaviour to be tested. Generally, commands are issued in normal mode causing the power controller to change the state of the system, and possibly the voltage of the relevant components depending on the command issued. A typical normal mode command will be used to change the state from RUN to DORMANT to save power. However, this requires that the power management controller tell the voltage regulator controlling the voltage to the relevant component to lower the voltage from the operational voltage $V_{DD}$ to zero. When a soft reset is issued, the power management controller will indicate that the voltage to the relevant component can be raised from zero to $V_{DD}$.

If the user wishes to test out software and hardware without testing the enabling and disabling of the voltage regulators (for example because the design of those voltage regulators has not yet been finalised), then a command can in preferred embodiments be issued in an emulation mode, in which an emulation bit contained within the command data sent to the power management controller is set. This will signal to the power management controller that it should translate the command data and change to the desired state, but that it should not issue a signal to the voltage regulator to indicate that the voltage should be lowered. In the emulation mode, once the command has been transmitted and received, the power management controller will issue a soft reset sequence. As mentioned earlier, the soft reset sequence is issued by the power management controller only during emulation mode. In normal mode, all forms of soft reset will be initiated from an external source.

As described earlier, when issuing commands to the power management controller, a specific protocol is followed. Firstly, software checks to see that both the transmit and receive data registers are empty. This can be accomplished by checking that the W flag is set and/or the R flag is cleared. When transmitting a command to the power management controller, software is used to write command data to the transmit data register, causing the W flag to be cleared. Hardware then performs a handshake with the power management controller, waiting for acceptance of the command data via a double-ended handshake. Once the handshake for the transmit data has completed, the hardware will then set the W flag again. When receiving data, software waits until the R flag is set. Once set, new data is valid in the receive register, and can be read by the processor core.

In preferred embodiments, the power management controller is designed such that if requested to move into a power state that it does not implement, then it defaults to the most power efficient state "above" the requested state. This ensures operating system portability across systems with different levels of sophistication of power management.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A data processing apparatus, comprising:
   a processor for executing data processing instructions including power management instructions, at least one of said power management instructions being a command power management instruction;
   a power management controller for receiving command data from the processor when a command power management instruction is executed by the processor, and to control power management logic to perform an associated set of power management functions dependent on said command data;
   first power management logic controllable by the power management controller;
   the power management controller having an interface to enable communication with additional power management logic;
   the processor being arranged when executing said command power management instruction to specify within said command data provided to the power management controller whether an emulation mode of operation is set, said power management controller being arranged when said emulation mode is not set to initiate said associated set of power management functions dependent on said command data, and being arranged when said emulation mode is set to only initiate a subset of said associated set of power management functions not requiring communication over said interface.

2. A data processing apparatus as claimed in claim 1, wherein said first power management logic comprises one or more power management isolation layers, each power management isolation layer being associated with a component of the data processing apparatus, and being controllable by the power management controller to isolate the associated component from other components of the data processing apparatus dependent on the command power management instruction being executed by the processor.

3. A data processing apparatus as claimed in claim 2, further comprising one or more additional processors, each processor having one of said power management isolation layers associated therewith.

4. A data processing apparatus as claimed in claim 1, wherein a handshake protocol is employed between the processor and the power management controller, such that when said processor issues said command data to said power management controller, said power management controller issues an acknowledgement signal to the processor to acknowledge receipt of the command data.

5. A data processing apparatus as claimed in claim 1, further comprising a communication path coupling said processor and said power management controller, said communication path including a transmit channel on which the processor is arranged to issue said command data to the power management controller.

6. A data processing apparatus as claimed in claim 5, wherein said processor includes a transmit register for storing said command data to be issued over said transmit channel.

7. A data processing apparatus as claimed in claim 6, wherein said emulation mode is specified by the value of a field within the transmit register.

8. A data processing apparatus as claimed in claim 1, wherein in said emulation mode, once said subset of said associated set of power management functions have been performed, said power management controller is arranged to emulate a reset function to cancel said subset of said associated set of power management functions.

9. A data processing apparatus as claimed in claim 8, wherein following said reset function, the processor is arranged to execute a status power management instruction to cause a request to be issued to the power management controller for status data identifying the status of the data processing apparatus after execution of said command power management instruction.

10. A data processing apparatus as claimed in claim 9, wherein said power management controller includes a status register and is arranged to store said status data in the status register after performance of said associated set of power management functions, the processor including a receive register for storing the status data as provided by the power management controller upon receipt of said request.

11. A data processing apparatus as claimed in claim 10, further comprising a communication path coupling said processor and said power management controller, said communication path comprising a transmit channel on which the processor is arranged to issue said command data to the power management controller, and a receive channel on which the processor is arranged to issue said request to said power management controller and on which the power management controller is arranged to return said status data.

12. A data processing apparatus as claimed in claim 11, wherein said processor further includes a channel status register for storing a first flag indicating whether the transmit channel is busy and a second flag for indicating whether the receive channel is busy.

13. A data processing apparatus as claimed in claim 1, wherein said processor comprises a processor core and a coprocessor and said coprocessor is arranged to execute said power management instructions.

14. A method of operating a data processing apparatus to test power management instructions, comprising the steps of:
   (a) executing on a processor a command power management instruction to generate command data;
   (b) issuing said command data to a power management controller;
   (c) controlling, via the power management controller, power management logic to perform an associated set of power management functions dependent on said command data, the data processing apparatus having first power management logic controllable by the power management controller, and the power management controller having an interface to enable communication with additional power management logic;
   at said step (a), the processor being arranged when executing said command power management instruction to specify within said command data provided to the power management controller whether an emulation mode of operation is set; and
   at said step (c), said power management controller being arranged when said emulation mode is not set to initiate said associated set of power management functions dependent on said command data, and being arranged when said emulation mode is set to only initiate a subset of said associated set of power management functions not requiring communication over said interface.

15. A method as claimed in claim 14, wherein said first power management logic comprises one or more power management isolation layers, each power management isolation layer being associated with a component of the data processing apparatus, and being controllable by the power management controller at said step (c) to isolate the associated component from other components of the data processing apparatus dependent on the command power management instruction being executed by the processor.

16. A method as claimed in claim 15, wherein the data processing apparatus further comprises one or more additional processors, each processor having one of said power management isolation layers associated therewith.

17. A method as claimed in claim 14, further comprising the step of employing a handshake protocol between the processor and the power management controller, such that when said processor issues said command data to said power management controller at said step (b), said power management controller issues an acknowledgement signal to the processor to acknowledge receipt of the command data.

18. A method as claimed in claim 14, further comprising the step of providing a communication path coupling said processor and said power management controller, said communication path including a transmit channel on which the processor is arranged to issue said command data to the power management controller at said step (b).

19. A method as claimed in claim 18, wherein said processor includes a transmit register for storing said command data to be issued over said transmit channel.

20. A method as claimed in claim 19, wherein said emulation mode is specified by the value of a field within the transmit register.

21. A method as claimed in claim 14, wherein in said emulation mode, once said subset of said associated set of power management functions have been performed, the method further comprises the step of causing said power management controller to emulate a reset function to cancel said subset of said associated set of power management functions.

22. A method as claimed in claim 21, wherein following said reset function, the method further comprises the step of executing on said processor a status power management instruction to cause a request to be issued to the power management controller for status data identifying the status of the data processing apparatus after execution of said command power management instruction.

23. A method as claimed in claim 22, wherein said power management controller includes a status register and is arranged to store said status data in the status register after performance of said associated set of power management functions, the processor including a receive register for storing the status data as provided by the power management controller upon receipt of said request.

24. A method as claimed in claim 23, further comprising the step of providing a communication path coupling said processor and said power management controller, said communication path comprising a transmit channel on which the processor is arranged to issue said command data to the power management controller, and a receive channel on which the processor is arranged to issue said request to said power management controller and on which the power management controller is arranged to return said status data.

25. A method as claimed in claim 24, further comprising the step of providing said processor with a channel status register for storing a first flag indicating whether the transmit channel is busy and a second flag for indicating whether the receive channel is busy.

26. A method as claimed in claim 14, wherein said processor comprises a processor core and a coprocessor and said coprocessor is arranged to execute said power management instructions.

27. A computer program product carrying a computer program for controlling an apparatus in accordance with the method of claim 14.

* * * * *